United States Patent
Boxall et al.

(10) Patent No.: US 9,092,565 B2
(45) Date of Patent: *Jul. 28, 2015

(54) SYNCHRONIZATION POINT VISUALIZATION FOR MODIFIED PROGRAM SOURCE CODE

(71) Applicant: International Business Machines Corporation, Armonk, NY (US)

(72) Inventors: Alan S. Boxall, Markham (CA); Roger E. Pett, Toronto (CA); Kendrick Wong, Markham (CA)

(73) Assignee: International Business Machines Corporation, Armonk, NY (US)

( * ) Notice: Subject to any disclaimer, the term of this patent is extended or adjusted under 35 U.S.C. 154(b) by 10 days.

This patent is subject to a terminal disclaimer.

(21) Appl. No.: 13/867,236

(22) Filed: Apr. 22, 2013

(65) Prior Publication Data

US 2013/0326497 A1    Dec. 5, 2013

Related U.S. Application Data

(63) Continuation of application No. 13/487,779, filed on Jun. 4, 2012.

(51) Int. Cl.
  *G06F 9/44* (2006.01)
  *G06F 11/36* (2006.01)

(52) U.S. Cl.
  CPC ........ *G06F 11/3628* (2013.01); *G06F 11/3632* (2013.01)

(58) Field of Classification Search
  USPC ......... 717/115–116, 125–133, 138, 144, 124; 714/35, 40, 47.1; 711/202; 707/755; 719/318; 703/21
  IPC ..................................... G06F 11/3664,11/3628
  See application file for complete search history.

(56) References Cited

U.S. PATENT DOCUMENTS 6,091,896 A * 7/2000 Curreri et al. ................. 717/125
6,256,777 B1    7/2001 Ackerman
(Continued)

OTHER PUBLICATIONS

Copperman,"Debugging Optimized Code Without Being Misled", ACM Transactions on Programming Language and Systems, vol. 16, No. 3, pp. 387-427 (May 1994).
Holzle, et al., "Debugging Optimized Code with Dynamic Deoptimization", ACM SIGPLAN '92 Conference on Programming Language Design and Implementation, San Fransisco; pp. 1-12 (Jun. 1992).

(Continued)

*Primary Examiner* — Tuan Vu
(74) *Attorney, Agent, or Firm* — Cantor Colburn LLP; Ryan Lewis (57) ABSTRACT

Visualization of synchronization points in modified program source code includes identifying the synchronization points in a program source code segment. The identification is performed in response to a modification of the program source code segment. The visualization of the synchronization points also includes storing line numbers of the synchronization points and line contents corresponding to text located at stored line numbers in the program source code segment. The visualization of the synchronization points further includes implementing, as part of a debugging session: retrieving the synchronization points and the line contents, displaying the line contents of the synchronization points on a display screen, and providing a user with an option to step through the synchronization points in the program source code while skipping the remaining portions of the program source code segment. Displaying the line contents includes visually differentiating the synchronization points from remaining portions of the program source code segment.

10 Claims, 7 Drawing Sheets

(56) References Cited

U.S. PATENT DOCUMENTS

| | | | |
|---|---|---|---|
| 6,378,124 | B1 | 4/2002 | Bates et al. |
| 6,434,741 | B1 | 8/2002 | Mirani et al. |
| 6,553,565 | B2 | 4/2003 | Click et al. |
| 6,681,384 | B1 * | 1/2004 | Bates et al. .................. 717/129 |
| 7,134,115 | B2 * | 11/2006 | Kawai et al. .................. 717/124 |
| 7,237,229 | B2 * | 6/2007 | Ogawa et al. ................. 717/125 |
| 7,287,246 | B2 | 10/2007 | Tan et al. |
| 2003/0061600 | A1 * | 3/2003 | Bates et al. .................. 717/133 |
| 2003/0088854 | A1 * | 5/2003 | Wygodny et al. ............. 717/130 |
| 2006/0190929 | A1 * | 8/2006 | Bennett et al. ................ 717/124 |
| 2008/0052683 | A1 * | 2/2008 | Bates et al. .................. 717/129 |
| 2011/0072309 | A1 * | 3/2011 | Sakai et al. ..................... 714/35 |

OTHER PUBLICATIONS

Kumar, et al., "Transparent Debugging of Dynamically Optimized Code", University of Pittsburgh, Proceedings of the 7th annual IEEE/ACM International Symposium on Code Generation and Optimization, [http://www.cs.pitt.edu/~childers/papers/cgo2009-cready-final.pdf] pp. 1-12, (2009).

U.S. Appl. No. 13/487,779; Non-Final Office Action; Date Filed: Jun. 4, 2012; Date Mailed Jul. 2, 2014; 17 pages.

U.S. Appl. No. 13/487,779; Notice of Allowance; Date Filed: Jun. 4, 2012; Date Mailed: Nov. 14, 2014.

* cited by examiner

```
1   int main (int argc, char** argv)
2   {
3     int i, j, k, m;
4
5     j = 0;
6     k = 0;
7     for (i = 0;
8          i < 10;
9          i++)
10    {
11      m = 1;
12      printf("Call # 1/n");
13      j = i;
14      printf("Call # 2/n");
15      k = i;
16      printf("Call # 3 %d\n", i + k);
17    }
18    printf("m = %d\n", m);
19    return 0;
20  }
```

```
300 int main ()
{
    int i, j, k, m;

k = 0;                                              // map to line 6          *unreferenced j removed
    m = 9;                                              // map to line 11         *hoisted out of loop
    for (i = 0);                                        // map to line 7
        i < 10;                                         // map to line 8
        i+=2)
    {
        k = i;                                          // map to line 15
        printf("Call # 1\n");                           // map to line 12
        printf("Call # 2\n");                           // map to line 14
        printf("Call # 3 %d\n", i + k);                 // map to line 16         *loop unrolled once
        printf("Call # 1\n");                           // map to line 12
        printf("Call # 2\n");                           // map to line 14
        k = i + 1;                                      // map to line 15
        printf("Call # 3 %d\n", i + k);                 // map to line 16
    }
    printf("m = %d\n", m);                              // map to line 18         *locality of reference
    return 0;                                           // map to line 19
}
```

302 (multiple)

FIG. 3

```
int main (int argc, char** argv)
{
    int i, j, k, m;

j = 0;
    k = 0;
    for (i = 0;
         i < 10;
         i++)
    {
        m = 1;
        printf("Call # 1/n");
        j = i;
        printf("Call # 2/n");
        k = i;
        printf("Call # 3 % d\n", i + k);
    }
    printf("m = % d\n", m);
    return 0;
}
```

SYNCHRONIZATION POINT VISUALIZATION FOR MODIFIED PROGRAM SOURCE CODE

CROSS-REFERENCE TO RELATED APPLICATIONS

This application is a continuation of U.S. patent application Ser. No. 13/487,779, filed Jun. 4, 2012, the entire contents of which are incorporated herein by reference.

BACKGROUND

This disclosure relates generally to software development, and more particularly to visualization of synchronization points used in debugging program source code.

Debugging modified program source code, such as program code run through an optimization process at compile time, can be challenging. This is because the modified code typically follows a different stepping pathway than the original program source code prior to the modification. For example, in a debugging session, optimized program code may exhibit a random hopping behavior due to rearrangement of the order of the lines of the code (or additions/deletions made to the lines of the code), which can be difficult to interpret for a user who is attempting to follow the logic in the original source code.

When a bug is detected in a modified program, the user is encouraged to compile the program without optimization prior to running a debugging session. Unfortunately, in some situations, recompiling is not an option, e.g., the bug may not manifest itself in an unoptimized program.

SUMMARY

In one aspect, a method for visualization of synchronization points in program source code is provided. The method includes identifying synchronization points in a program source code segment. The identification is performed in response to modification of the program source code segment. The method also includes storing, by a computer, line numbers of the synchronization points and line contents corresponding to text located at stored line numbers in the program source code segment. The method further includes implementing as part of a debugging session: retrieving the synchronization points and the line contents; displaying the line contents of the synchronization points on a display screen; and providing a user with an option to step through the synchronization points in the program source code while skipping the remaining portions of the program source code segment. The display of the line contents includes visually differentiating the synchronization points from remaining portions of the program source code segment.

In another aspect, a computer program product for visualization of synchronization points in program source code is provided. The computer program product includes a computer readable storage medium embodied with computer code that, when executed by a computer, causes the computer to implement a method. The method includes identifying synchronization points in a program source code segment. The identification is performed in response to modification of the program source code segment. The method also includes storing line numbers of the synchronization points and line contents corresponding to text located at stored line numbers in the program source code segment. The method further includes implementing as part of a debugging session: retrieving the synchronization points and the line contents; displaying the line contents of the synchronization points on a display screen; and providing a user with an option to step through the synchronization points in the program source code while skipping the remaining portions of the program source code segment. The display of the line contents includes visually differentiating the synchronization points from remaining portions of the program source code segment.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE DRAWINGS

Referring now to the drawings wherein like elements are numbered alike in the several FIGURES.

DETAILED DESCRIPTION

Visualization of synchronization points in modified program source code is provided, with exemplary embodiments being discussed below in detail. To enable users to conduct debug sessions on modified program source code, the exemplary embodiments provide a way to identify synchronization points in the unmodified program source code, e.g., using logic applied at compile time, apply a marking to the synchronization points within program source code that is to be displayed during a debugging session. In addition, logic applied during the debugging session provides an option that enables the user to select from different stepping methods: line-by-line stepping and stepping through the synchronization points. In this manner, for example, the user can step through each executable statement in the program source code for a granular level view and then switch, as desired, to a method of stepping directly between each identified synchronization point in the program source code, thereby providing the user with the ability to easily follow the logic from the original source code.

A synchronization point refers to a point or location within computer program source code where it is known or established that all instructions or statements prior to that point have been executed. Thus, a synchronization point has the following characteristics: it maps to an original source code executable statement; and all executable statements that would normally be executed in an unoptimized program before this point have completed execution.

Figure 1A:
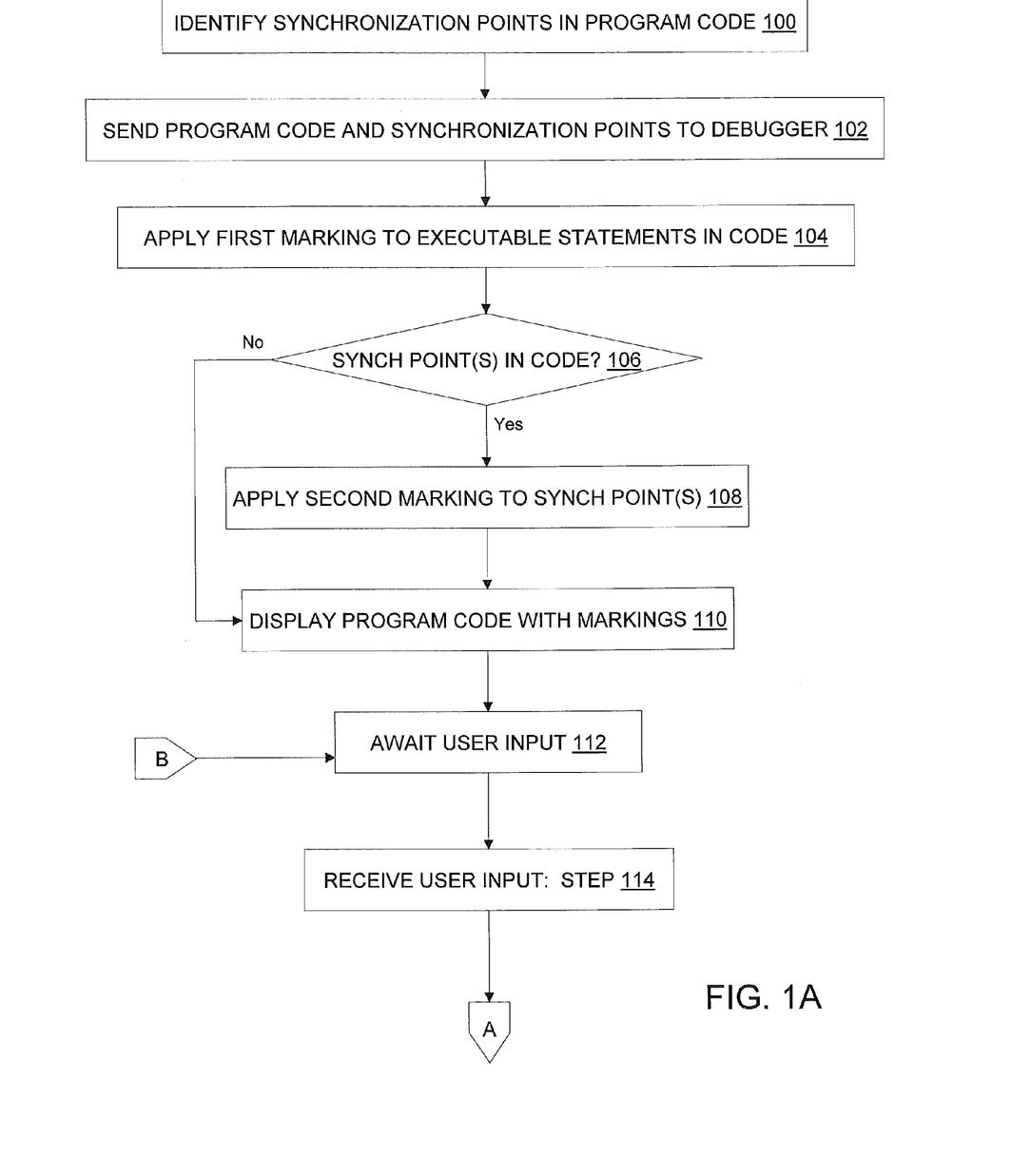
FIGS. 1A-1B illustrate a flow diagram of a process for implementing visualization of synchronization points in modified program source code in accordance with an embodiment.

FIG. 1 illustrates a flowchart of an embodiment of a method for implementing visualization of synchronization points in a program development and testing environment. The process may be used in conjunction with program source code written in any computer language, including but not limited to, Java™, Visual Basic, C, Python, or C++. By way of example, a program source code segment 200 prior to modification is shown in FIG. 2. As illustrated in FIG. 2, there are 20 lines of program source code for the identified segment 200.

Figure 2:
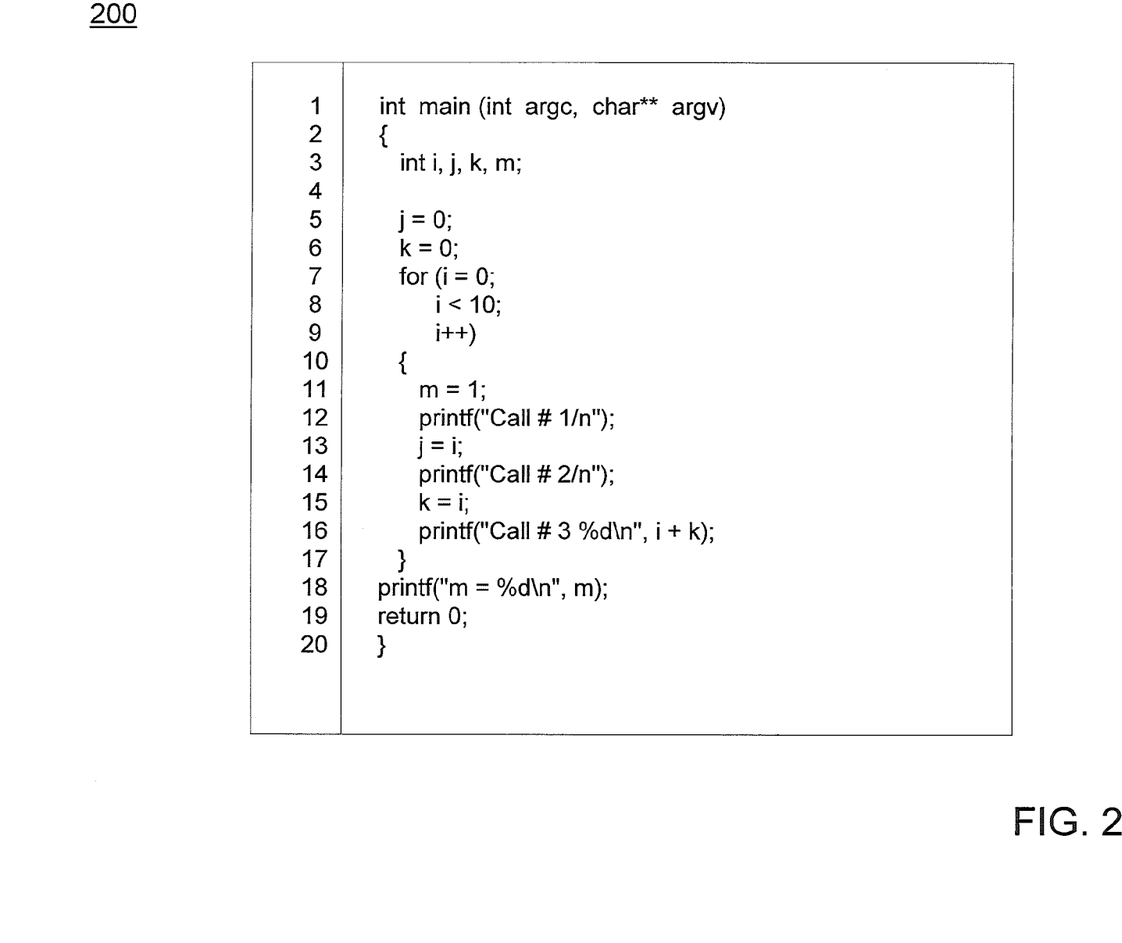
FIG. 2 illustrates a program source code segment prior to modification.
Figure 3:
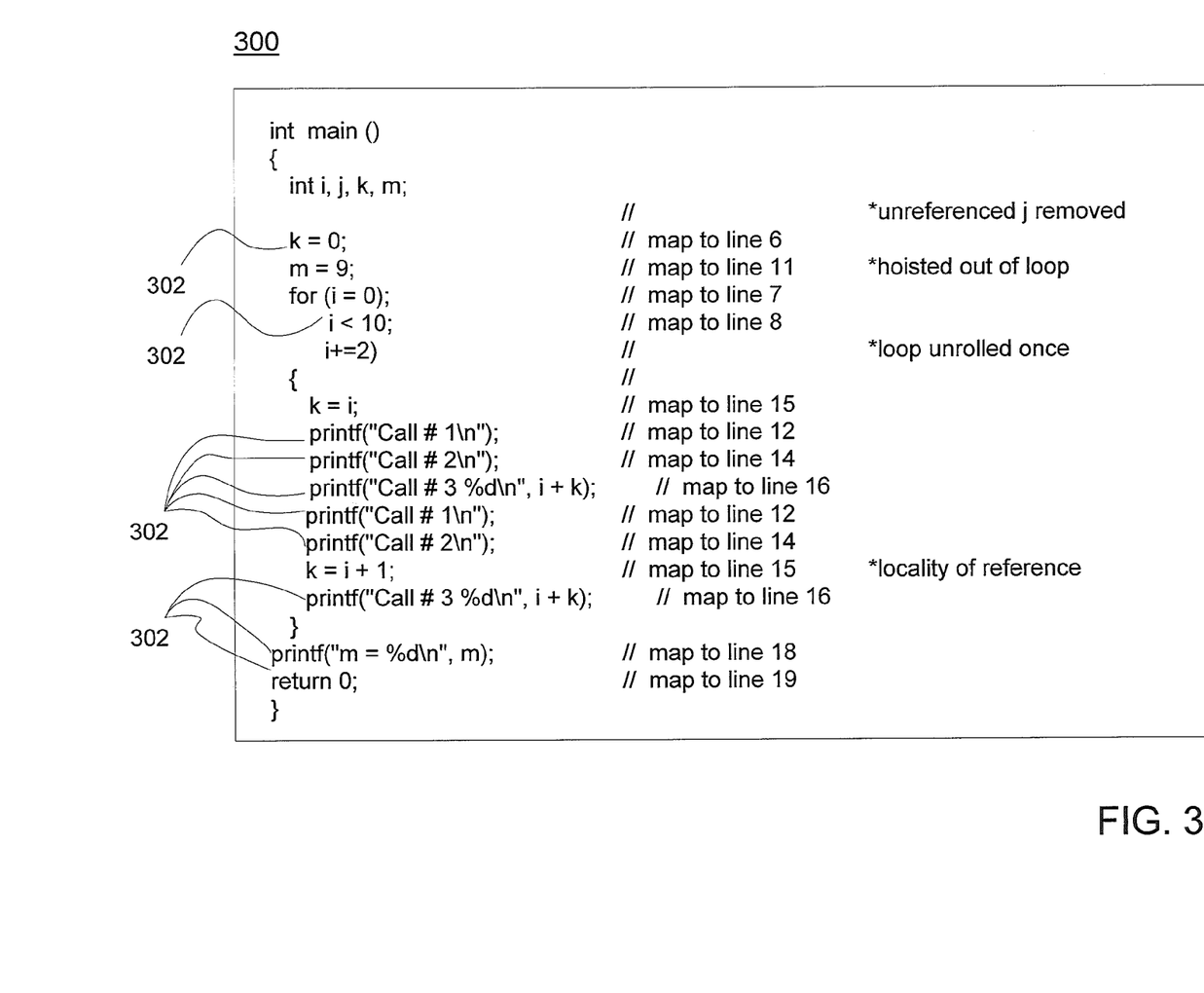
FIG. 3 illustrates the program code segment of FIG. 2 after modification.

The process of FIG. 1 assumes that the original program source code has been modified by changing the order of execution of the source lines, and/or deleting source lines, and/or adding source lines have been, and/or modifying the text within a source line. The modification may be implemented to provide optimization, e.g., using an optimizer component of a compiler. Using the above program source code segment 200 by way of example, a segment 300 of modified program source code is shown in FIG. 3. The example of FIG. 3 illustrates the result of running the program source code segment 200 through an optimizer.

As indicated above, a debugging session running optimized program code may exhibit a random hopping behavior due to rearrangement of the order of the lines of the code (or additions/deletions made to the lines of the code), which can be difficult to interpret for a user who is attempting to follow the logic in the original source code. For example, an original (e.g., unmodified) program source code segment, such as segment 200 of FIG. 2, for example, would follow a stepping behavior through main( ) and stop at lines 5, 6, 7, 8, 11, 12, 13, 14, 15, 16, 9, until i reached 10, then stopping at lines 18, 19. However, once optimized as shown by the modified program source code segment 300 in FIG. 3, the stepping behavior for the segment 300 would consist of lines 6, 11, 7, then looping through lines 8, 15, 12, 14, 16, 12, 14, 15, 16, until i reached 10, then stopping at lines 18, 19.

Synchronization points within the program source code segment are identified at block 100. The synchronization points may be identified by their corresponding line numbers of the program source code prior to the modification. This information may be stored in a memory location along with the contents of the line numbers. As illustrated in FIG. 3, synchronization points identified for the program source code segment 300 are shown at 302.

Thus, synchronization points may be established to eliminate the random hopping behavior otherwise attributed to optimized program code. As indicated above, using the synchronization points established for the program source code segment 300 of FIG. 3, the stepping behavior through the synchronization points would stop at line 6, then loop through lines 8, 12, 14, 16, 12, 14, 16, until i reaches 10, then stop at lines 18, 19. Note that this set of points is a subset of the unoptimized stopping points. In addition, the execution order of the stopping points is the same. This eliminates the random hopping associated with optimized code.

At block 102, the program source code, along with the synchronization points (e.g., identifying the line number(s) and contents) associated therewith, are sent from the compiler to a debugger.

Figure 4:
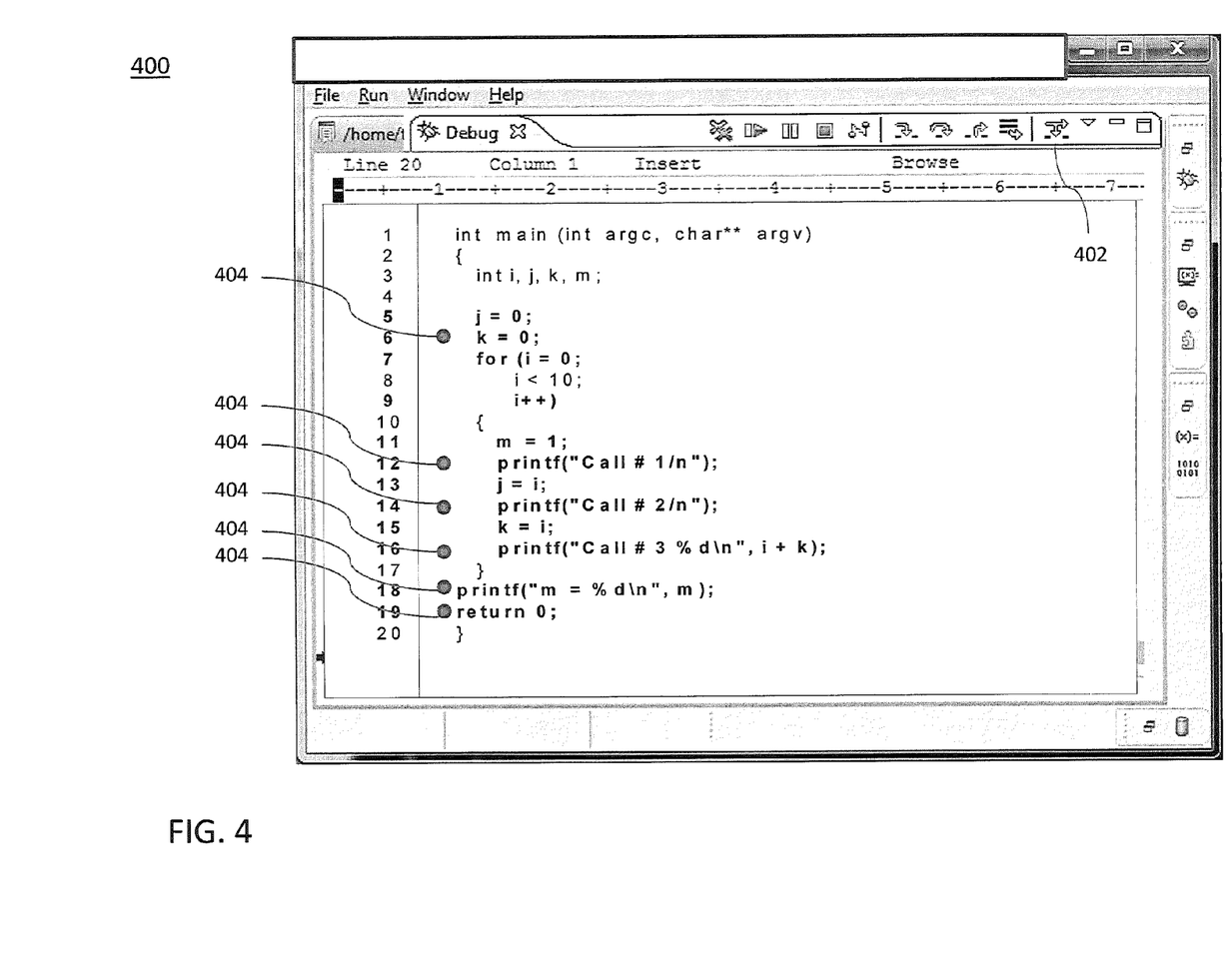
FIG. 4 illustrates a computer screen window of the program source code segment with synchronization point markings in accordance with an embodiment.

At block 104, a first marking is applied to executable statements identified in the program source code. Executable statements may be distinguished from other portions of the program source code using any technique, such as text color, text highlighting, text bolding, or other means. By way of non-limiting example, FIG. 4 illustrates a computer screen window 400 (e.g., a debug pane in a graphical debugger user interface) depicting program source code where executable statements are differentiated by bolding the text.

At block 106, the memory location storing the synchronization point information described above is checked to see if any synchronization points exist for the program source code.

If one or more synchronization points exist for the program source code at block 106, a second marking is applied to the synchronization points at block 108. The synchronization points may be distinguished from other portions of the program source code using any technique, such as text color, text highlighting, text bolding, or other means, as long as the second marking chosen is different from the first marking. As shown in FIG. 4 by way of non-limiting example, the computer screen window 400 depicts program source code where the synchronization points are differentiated by dots 404 placed adjacent to the synchronization points.

If, however, no synchronization points exist for the program code (block 106), or alternatively, once the second marking has been applied to the synchronization points (108), the program code is displayed in the computer screen window as it appeared prior to the modification at block 110, and the process awaits user input at block 112. Thus, at this time, the computer screen window (e.g., window 400 of FIG. 4) illustrates the program code having a first marking indicative of executable statements (e.g., bold text) and a second marking indicative of program code synchronization points (e.g., dots 404).

Figure 1B:
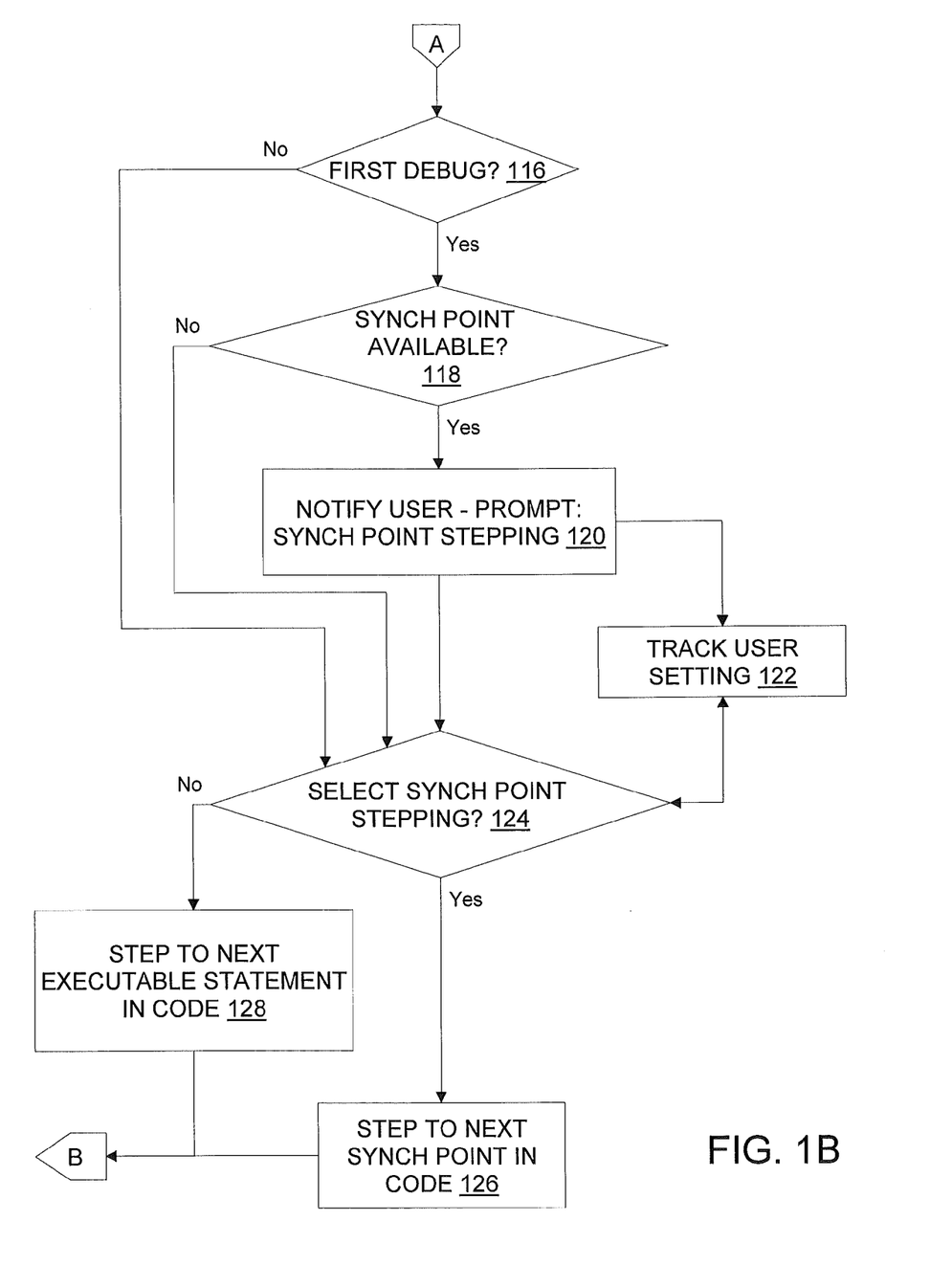

At block 114, user input is received and the process continues to FIG. 1B. The user input is directed to one or more activities conducted by a user for a debug session.

At block 116, the process checks to see if this is the first time this program source code has been run through the debugger.

If it is not the first time the program source code has been run through the debugger (block 116), the process skips to block 124. However, if it is the first time the program source code has been run through the debugger, this means there is no history on whether synchronization points have been identified for this program source code. In this instance, the process checks to see if any synchronization points exist in the program source code at block 118. If so, the user is notified of this determination at block 120. For example, the process may include a prompt, e.g., via the computer screen window 400, that indicates such synchronization points exist and direct the user to select a stepping method that steps from one synchronization point in the program source code to the next synchronization point while skipping other portions of the code. For example, as shown in FIG. 4, a toolbar for a debugger includes an option 402, which upon selection by the user, causes the process to implement the synchronization point method of stepping through the program source code. If the user does not select this option 402, the process may be configured to initiate a line-by-line method of stepping through the program source code (e.g., stepping through each executable statement in the program source code).

At block 122, the debugger tracks the option selected by the user, e.g., including any switching between methods of stepping, and the process continues to block 124.

Alternatively, if there are no synchronization points in the program code (block 118), the process continues to block 124.

At block 124, the process determines from the user input whether the synchronization point method of stepping has been chosen by the user. If so, the process causes the debugger to switch to the synchronization point stepping method at block 126, and the process returns to block 112 of FIG. 1A. Using the example provided above with respect to the synchronization points identified for the modified program source code segment 300, if the user selects the synchronization point stepping method, the stepping behavior through the synchronization points would stop at lines 6, 8, 12, 14, 16, 12, 14, 16, 18, 19 with a loop repeating from line 8 through the second instance of line 16 until i reaches 10. In other words, the process stops at the identified synchronization points only. As indicated above, if there are executable statements between adjacent synchronization points, this is an indication that the compiler has performed some optimization between the two synchronization points. If a more granular stepping method is desired by the user, the user can choose to perform normal stepping to examine how the code hops between the two synchronization points by selecting the step-by-step method that stops at each executable statement in the program source code. This may be implemented, for example, by de-selecting the option 402 on the toolbar of computer screen window 400.

Alternatively, if the user has not selected the synchronization point method of stepping through the program code, the debugger steps through each executable statement in the code as a default mechanism at block 128, and the process returns to block 112 in FIG. 1A.

Figure 5:
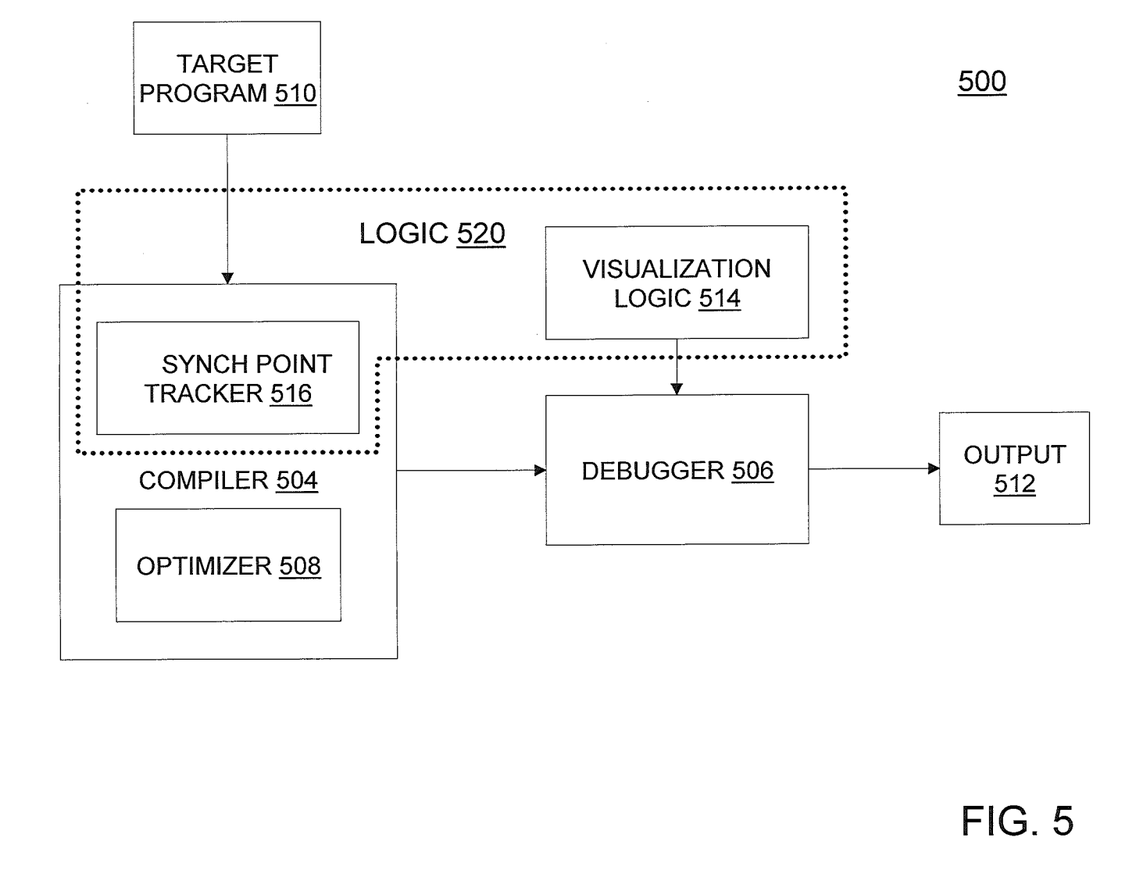
FIG. 5 illustrates a block diagram including functional components for use in implementing visualization of synchronization points in modified program source code in accordance with an embodiment.

FIG. 5 illustrates an embodiment of a system 500 including functional components for implementing the visualization of synchronization points for modified program code. These components implement the process described in FIGS. 1A-1B. A target program 510, which corresponds to the program source code, is run through a compiler 504. The compiler 504 may optimize the program source code using an optimizer component 508, which results in modified program source code. During the compilation process, the program source code (target program 510) is processed by the compiler 504, which analyzes the program source code to identify synchronization points as described above. These synchronization points and locations may be stored in a memory location (see, e.g., FIG. 6) by the synchronization point logic 516 or may be transmitted to a debugger 506. Once the target program 510 has been compiled and modified, and the synchronization points have been identified, the target program 510 and, optionally the synchronization points, are sent to the debugger 506. Alternatively, the synchronization points may remain stored in the memory location, and the debugger 506 retrieves the synchronization points as described further herein. The debugger 506 may be modified to include visualization logic 514, which renders the visualization of the synchronization points on a debug pane of a computer screen. The results of the processing performed by the synchronization point logic 516 and the visualization logic 514 are provided as output 512 to a user's computer (e.g., the computer screen window 400 of FIG. 4). The synchronization point logic 516 and the visualization logic 514 are collectively referred to as logic 520 for simplicity. In one embodiment, the visualization logic 514 searches the memory location for the location of the synchronization points for correlation and display on the computer screen. The visualization logic 514 includes the functionality to provide the synchronization point stepping option 402, as well as the rendering of the synchronization points 404 on the computer screen.

Figure 6:
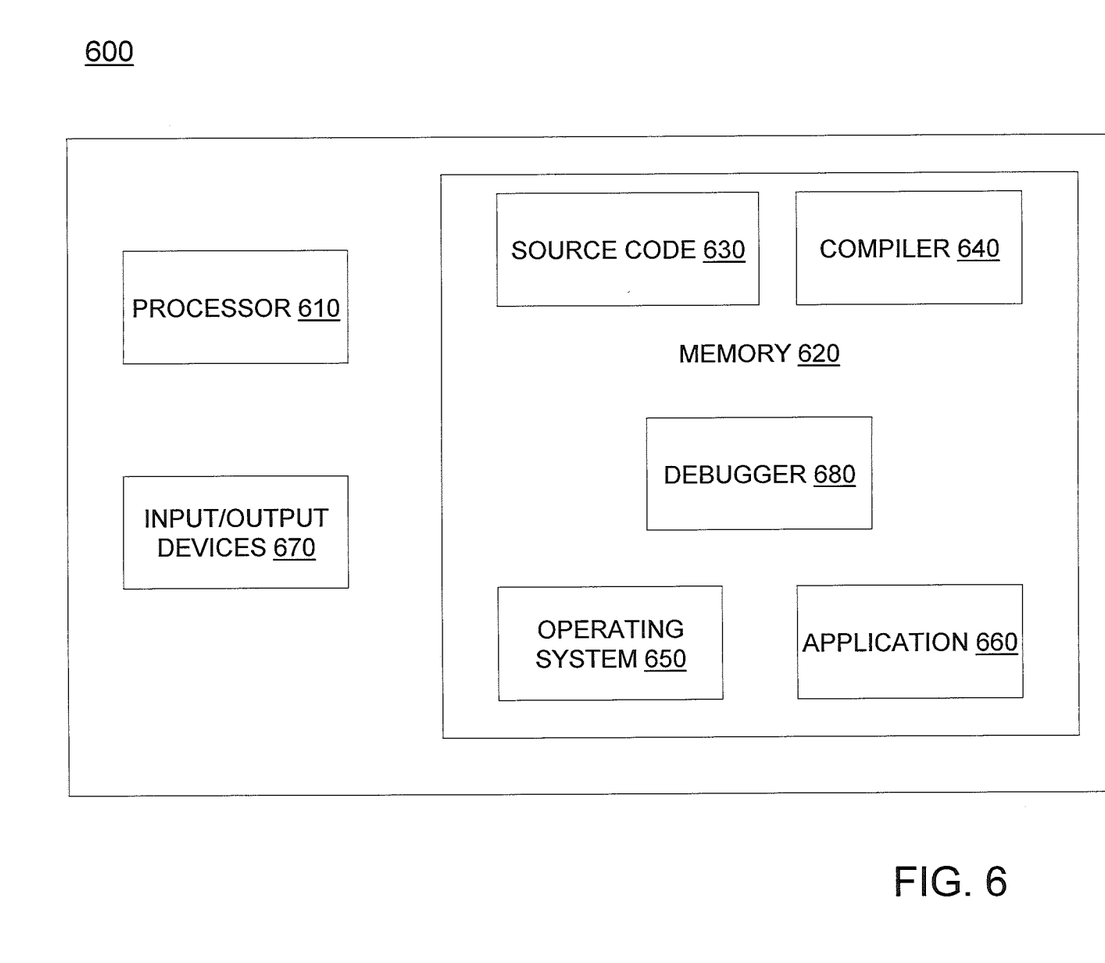
FIG. 6 illustrates a block diagram of a computer system that may be used in conjunction with methods for implementing visualization of synchronization points in modified program source code in accordance with an embodiment.

FIG. 6 illustrates an example of a computer 600 which may be utilized by exemplary embodiments of a method for visualization of synchronization points for modified program source code as embodied in software. Various operations discussed above may utilize the capabilities of the computer 600. One or more of the capabilities of the computer 600 may be incorporated in any element, module, application, and/or component discussed herein.

The computer 600 includes, but is not limited to, PCs, workstations, laptops, PDAs, palm devices, servers, storages, and the like. Generally, in terms of hardware architecture, the computer 600 may include one or more processors 610, memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a digital signal processor (DSP), or an auxiliary processor among several processors associated with the computer 600, and the processor 610 may be a semiconductor based microprocessor (in the form of a microchip) or a macroprocessor.

The memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

In an embodiment, the synchronization points and locations are stored in the memory 620 and retrieved by the logic 520 in implementing the visualization of synchronization points for modified program code described herein.

The software in the memory 620 may include one or more separate programs, each of which comprises an ordered listing of executable instructions for implementing logical functions. The software in the memory 620 includes a suitable operating system (O/S) 650, compiler 640, debugger 680, source code 630, and one or more applications 660 in accordance with exemplary embodiments. As illustrated, the application 660 comprises numerous functional components for implementing the features and operations of the exemplary embodiments. The application 660 of the computer 600 may represent various applications, computational units, logic, functional units, processes, operations, virtual entities, and/or modules in accordance with exemplary embodiments, but the application 660 is not meant to be a limitation. In an embodiment, the application 660 includes the logic 520, the compiler 640 corresponds to the compiler 504, the source code 630 corresponds to the target program 510, and the debugger 680 corresponds to the debugger 506, each of which is depicted in FIG. 5.

The operating system 650 controls the execution of other computer programs, and provides scheduling, input-output control, file and data management, memory management, and communication control and related services. It is contemplated by the inventors that the application 660 for implementing exemplary embodiments may be applicable on all commercially available operating systems.

Application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 670 may include input devices such as, for example but not limited to, a mouse, keyboard, scanner, microphone, camera, etc. Furthermore, the I/O devices 670 may also include output devices, for example but not limited to a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or intranet.

If the computer 600 is a PC, workstation, intelligent device or the like, the software in the memory 620 may further include a basic input output system (BIOS) (omitted for simplicity). The BIOS is a set of essential software routines that initialize and test hardware at startup, start the O/S 650, and support the transfer of data among the hardware devices. The BIOS is stored in some type of read-only-memory, such as ROM, PROM, EPROM, EEPROM or the like, so that the BIOS can be executed when the computer 600 is activated.

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

The technical effects and benefits of exemplary embodiments include identifying synchronization points in program source code after modification and visualizing the synchronization points on a computer screen along with the program code and enabling a user to step through the synchronization points without stepping through every line in the program code.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The invention claimed is:

1. A method, comprising:

recording, in a memory device prior to a debugging session, synchronization points including line numbers of the synchronization points and line contents corresponding to text located at stored line numbers in a program source code segment;

generating, by the compiler, optimized program source code from the program source code segment;

upon receiving, by a debugger, the optimized program source code from the compiler, providing a user with an option via a toolbar displayed on a display screen to step through the synchronization points in the optimized program source code while skipping remaining portions of the optimized program source code in a debug pane of the display screen;

displaying, in the debug pane of the display screen, a first marking applied to the executable statements in the optimized program source code, the first marking configured to visually differentiate the executable statements from remaining portions of the optimized program source code in the debug pane, the displaying further including a second marking applied to the line contents in the optimized program source code that are associated with the synchronization points, the second marking applied based on the line numbers and results of the recording, the second marking configured to visually differentiate the synchronization points from the executable statements and the remaining portions of the optimized program source code, and the second marking providing an ordered indication as to which part of the completed statement executions have been optimized with respect to the program source code segment that is displayed on the display screen, wherein the indication of locations marked by the synchronization points as shown in the debug panel enables manual stepping, as a non-default manual stepping method, and enables corrective action to be determined;

wherein a default non-manual stepping method is initiated at the start of the debugging session and executes a flow of statements using the first marking that is indicative of executed statements; and wherein, as indicated in real time, the recorded synchronization points represented as the second marking, and concurrent to the first marking that is different from the second marking, enable the user to elect a particular synchronization point among the program source code, such that upon selection, the debugger exits the default non-manual stepping method and executes debugged code from the point of the user's selection.

2. The method of claim 1, wherein the visually differentiating the synchronization points from the executable statements and the remaining portions of the program source code segment is implemented by at least one of:

annotating lines corresponding to the synchronization points with a marking that is adjacent to each of the lines;

highlighting lines corresponding to the synchronization points;

bolding lines corresponding to the synchronization points; and displaying lines corresponding to the synchronization points in a color that is different than a color used to display the remaining portions of the program source code segment.

3. The method of claim 1, further comprising providing a user with an option to step line-by-line through each of the executable statements in the program source code segment.

4. The method of claim 3, wherein the option is further configured to enable a user to toggle, via selection and deselection of an icon on the toolbar of the display screen, between stepping between the synchronization points and stepping line-by-line through each of the executable statements in the program source code segment.

5. The method of claim 1, further comprising, upon initiation of a subsequent debugging session for the program source code segment:
   upon determining that the program source code segment has been previously run through the debugger:
   retrieving existing synchronization points in the program source code segment, the existing synchronization points identified from the debugging session conducted before the subsequent debugging session;
   notifying the user that the existing synchronization points are present; and
   prompting the user to select a stepping method.

6. A computer program product comprising a computer-readable storage medium having instructions embodied thereon, which when executed by a computer, cause the computer to implement a method, comprising:
   recording, in a memory device prior to a debugging session, synchronization points including line numbers of the synchronization points and line contents corresponding to text located at stored line numbers in a program source code segment;
   generating, by the compiler, optimized program source code from the program source code segment;
   upon receiving, by a debugger, the optimized program source code from the compiler, providing a user with an option via a toolbar displayed on a display screen to step through the synchronization points in the optimized program source code while skipping remaining portions of the optimized program source code in a debug pane of the display screen;
   displaying, in the debug pane of the display screen, a first marking applied to the executable statements in the optimized program source code, the first marking configured to visually differentiate the executable statements from remaining portions of the optimized program source code in the debug pane, the displaying further including a second marking applied to the line contents in the optimized program source code that are associated with the synchronization points, the second marking applied based on the line numbers and results of the recording, the second marking configured to visually differentiate the synchronization points from the executable statements and the remaining portions of the optimized program source code, and the second marking providing an ordered indication as to which part of the completed statement executions have been optimized with respect to the program source code segment that is displayed on the display screen, wherein the indication of locations marked by the synchronization points as shown in the debug panel enables manual stepping, as a non-default manual stepping method, and enables corrective action to be determined;
   wherein a default non-manual stepping method is initiated at the start of the debugging session and executes a flow of statements using the first marking that is indicative of executed statements; and
   wherein, as indicated in real time, the recorded synchronization points represented as the second marking, and concurrent to the first marking that is different from the second marking, enable the user to elect a particular synchronization point among the program source code, such that upon selection, the debugger exits the default non-manual stepping method and executes debugged code from the point of the user's selection.

7. The computer program product of claim 6, wherein the visually differentiating the synchronization points from the executable statements and the remaining portions of the program source code segment is implemented by at least one of:
   annotating lines corresponding to the synchronization points with a marking that is adjacent to each of the lines;
   highlighting lines corresponding to the synchronization points;
   bolding lines corresponding to the synchronization points; and
   displaying lines corresponding to the synchronization points in a color that is different than a color used to display the remaining portions of the program source code segment.

8. The computer program product of claim 6, wherein the method further comprises providing a user with an option to step line-by-line through each of the executable statements in the program source code segment.

9. The computer program product of claim 8, wherein the option is further configured to enable a user to toggle, via selection and deselection of an icon on the toolbar of the display screen, between stepping between the synchronization points and stepping line-by-line through each of the executable statements in the program source code segment.

10. The computer program product of claim 6, wherein the method further comprises, upon initiation of a subsequent debugging session for the program source code segment:
   upon determining that the program source code segment has been previously run through the debugger:
   retrieving existing synchronization points in the program source code segment, the existing synchronization points identified from the debugging session conducted before the subsequent debugging session;
   notifying the user that the existing synchronization points are present; and
   prompting the user to select a stepping method.

* * * * *